United States Patent [19]
Schlagwein

[11] Patent Number: 5,373,752
[45] Date of Patent: Dec. 20, 1994

[54] POWER ACTUATOR FOR MOTOR-VEHICLE DOOR LATCH

[75] Inventor: Ulrich Schlagwein, West Bloomfield, Mich.

[73] Assignee: Kiekert GmbH & Co. KG, Heiligenhaus, Germany

[21] Appl. No.: 98,498

[22] Filed: Jul. 28, 1993

[30] Foreign Application Priority Data

Aug. 8, 1992 [DE] Germany ............... 4226304

[51] Int. Cl.$^5$ ............... F16H 25/18; F16H 3/40; E05B 47/00
[52] U.S. Cl. ............... 74/89.15; 74/354; 74/404; 292/DIG. 43; 292/201
[58] Field of Search ............... 74/89.15, 354, 404; 292/201, DIG. 43

[56] References Cited

U.S. PATENT DOCUMENTS

| | | | |
|---|---|---|---|
| 4,624,491 | 11/1986 | Vincent | 74/89.15 X |
| 4,669,283 | 6/1987 | Ingenhoven | 74/89.15 X |
| 4,723,454 | 2/1988 | Periou et al. | 74/89.15 |
| 4,932,277 | 6/1990 | Beaux | 74/89.15 |
| 4,978,155 | 12/1990 | Kobayashi | 292/201 X |
| 5,079,964 | 1/1992 | Hamada et al. | 292/201 X |
| 5,149,156 | 9/1992 | Kleefeldt | 292/201 X |

FOREIGN PATENT DOCUMENTS 3443288  6/1986  Germany.
8621592  11/1986  Germany.

*Primary Examiner*—Allan D. Herrmann
*Attorney, Agent, or Firm*—Herbert Dubno; Andrew Wilford

[57] ABSTRACT

A motor-vehicle power actuator has a housing, an electric motor in the housing having an output shaft, an input gear fixed on the shaft, a threaded spindle extending along and rotatable about a spindle axis in the housing, an output gear fixed on the spindle adjacent and out of contact with the input gear, and a nut threaded on the spindle and nonrotatable relative thereto. Thus rotation of the spindle in one rotational sense displaces the nut axially relative to the spindle axis in a release direction. A rocker pivotal in the housing on the shaft axis carries an intermediate gear meshing with the input gear, and also meshable with the output gear. The rocker is pivotal between an end position in which the intermediate gear meshes with the output gear and through an intermediate position in which the intermediate gear does not mesh with the output gear. The rocker and intermediate gear are so positioned that, on normal forward rotation of the motor shaft, the rocker moves into its end position. A biasing unit urges the rocker into the intermediate position except when the motor is energized and is rotatably driving its shaft and a spring unit engaged between the housing and the nut axially biases the nut in one of the directions so that when the motor is not actuated the biasing unit disconnects the input and intermediate gears from the output gear and the spring unit urges the nut in the one direction.

7 Claims, 3 Drawing Sheets

POWER ACTUATOR FOR MOTOR-VEHICLE DOOR LATCH

FIELD OF THE INVENTION

The present invention relates to a power actuator. More particularly this invention concerns a power actuator such as used to operate a motor-vehicle door latch.

BACKGROUND OF THE INVENTION

A standard motor-vehicle power actuator has a housing, a normally reversible electric motor in the housing having an output shaft defining a shaft axis, an input gear fixed on the shaft axis and rotatable thereabout by the motor, a threaded spindle extending along and rotatable about a spindle axis in the housing, an output gear fixed on the spindle adjacent and out of contact with the input gear and coupled to the input gear, and a nut threaded on the spindle and nonrotatable relative thereto. Thus rotation of the spindle in one rotational sense displaces the nut axially relative to the spindle axis in an actuation direction and rotation of the spindle in an opposite rotational sense displaces the nut axially relative to the spindle in an opposite release direction.

As described in German patent 3,443,288 of J. Ingenhoven a coupling that can be overpowered is provided between the input gear and the output gear. Such a device is provided in a motor-vehicle door and is used to actuate its latch. A manual return device is provided to reset the actuator in its starting position by overpowering the coupling. Thus once the power actuator has released the latch, for instance, the user can return the latch to the ready position, repositioning the power actuator to its starting position. Unless the power actuator is manually reset, it cannot be used again to open the latch.

Accordingly in German utility model G 8,621,592 published 20 Nov. 1986 the motor loads a spring as it moves the nut into the actuated outer position. Once the motor is no longer energized, the stored spring force reverse rotates the spindle to return the parts to their starting position. This system does indeed reset itself, but is fairly bulky because the motor must be powerful enough to operate the latch and load the spring, and the spring must be powerful enough to reverse-drive the rotor of the motor and the entire drive train between the motor and the latch.

OBJECTS OF THE INVENTION

It is therefore an object of the present invention to provide an improved motor-vehicle power actuator.

Another object is the provision of such an improved motor-vehicle power actuator which overcomes the above-given disadvantages, that is which resets itself automatically and also that is relatively simple, small, and compact.

SUMMARY OF THE INVENTION

A motor-vehicle power actuator has a housing, an electric motor in the housing having an output shaft defining a shaft axis and rotatable thereabout, an input gear fixed on the shaft axis and rotatable thereabout by the motor, a threaded spindle extending along and rotatable about a spindle axis in the housing, an output gear fixed on the spindle adjacent and out of contact with the input gear, and a nut threaded on the spindle and nonrotatable relative thereto. Thus rotation of the spindle in one rotational sense displaces the nut axially relative to the spindle axis in an actuation direction and rotation of the spindle in an opposite rotational sense displaces the nut axially relative to the spindle in an opposite release direction. A rocker pivotal in the housing on the shaft axis carries an intermediate gear meshing with the input gear, and also meshable with the output gear. The rocker is pivotal between an end position in which the intermediate gear meshes with the output gear and through an intermediate position in which the intermediate gear does not mesh with the output gear. The rocker and intermediate gear are so positioned that, on normal forward rotation of the motor shaft, the rocker moves into its end position. A biasing unit urges the rocker into the intermediate position except when the motor is energized and is rotatably driving its shaft and a spring unit engaged between the housing and the nut axially biases the nut in one of the directions so that when the motor is not actuated the biasing unit disconnects the input and intermediate gears from the output gear and the spring unit urges the nut in the one direction.

Thus with this system, as soon as the motor is deenergized, the rocker returns to its intermediate position and disconnects the motor, input gear, and intermediate gear from the rest of the system. The spring need merely then return the nut and spindle to their starting position. Thus this spring will need less work to load it and will have to exert less force to do its job, making the system fairly compact, small, and simple, It will automatically reset only those parts—the nut, spindle, and whatever linkage and output members are connected to them—that need resetting.

According to this invention the motor is reversible and the rocker is provided with two such intermediate gears and is movable through two such respective end positions in each of which a respective one of the intermediate gears is meshing with the output gear and the other intermediate gear is out of mesh with the output gear. Both intermediate gears are out of mesh with the output gear in the intermediate position. Thus the system can be effective to reverse itself if necessary, as for instance in a side-door latch.

The rocker in accordance with this invention is of U-section and has a pair of side walls extending diametrally of the shaft and traversed thereby. The intermediate gears are journaled in the side walls and diametrically flank the input gear. The biasing unit can be a mechanical spring braced between the housing and the rocker or it can be a magnet seated in the housing and another magnet in the rocker adjacent the housing magnet. The spring unit can be a simple bellows spring connected between the housing and the nut.

BRIEF DESCRIPTION OF THE DRAWINGS

The above and other objects, features, and advantages will become more readily apparent from the following description, reference being made to the accompanying drawing in which.

SPECIFIC DESCRIPTION

Figure 1:
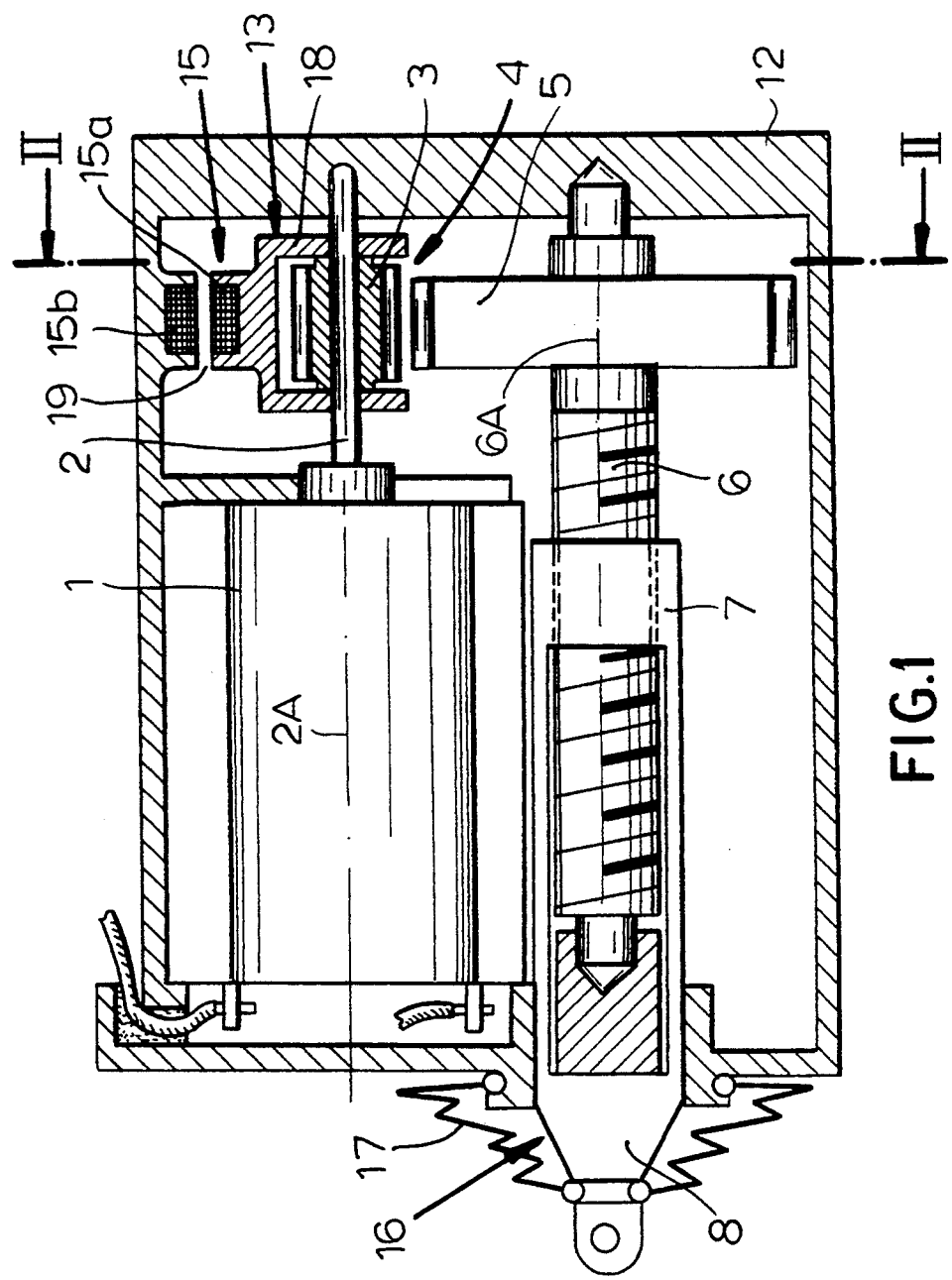
FIG. 1 is a section through the actuator according to the invention.
Figure 2:
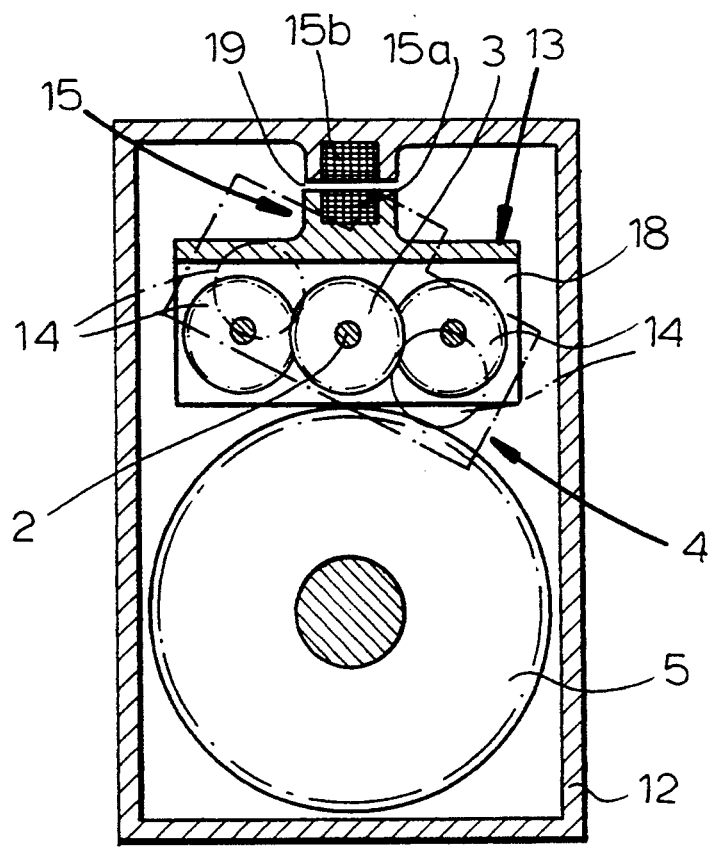
FIG. 2 is a section taken along line II—II of FIG. 1.

As seen in FIGS. 1 and 2 a power actuator for a motor-vehicle door latch has a housing 12 normally mounted in a door and provided with a reversible electric motor 1 having an output shaft 2 centered on and rotatable about an axis 2A and carrying a small-diameter input gear 3. A coupling 4 described more fully below can connect this gear 3 with a large-diameter output gear 5 fixed on a threaded spindle 6 rotatable in the housing 12 about an axis 6A parallel to and fixed relative to the axis 2A.

A nut 7 is threaded on a coarse thread of the spindle 6 but is fixed against rotation in the housing 12 so that as the spindle 6 rotates the nut 7 is moved along the axis 6A in a direction dependent on the direction of rotation of the spindle 6 about the axis 6A. This nut 7 has an outer end 8 forming an operating member that is connected as shown in FIG. 3 via a rod 9 to a door latch 10.

Figure 3:
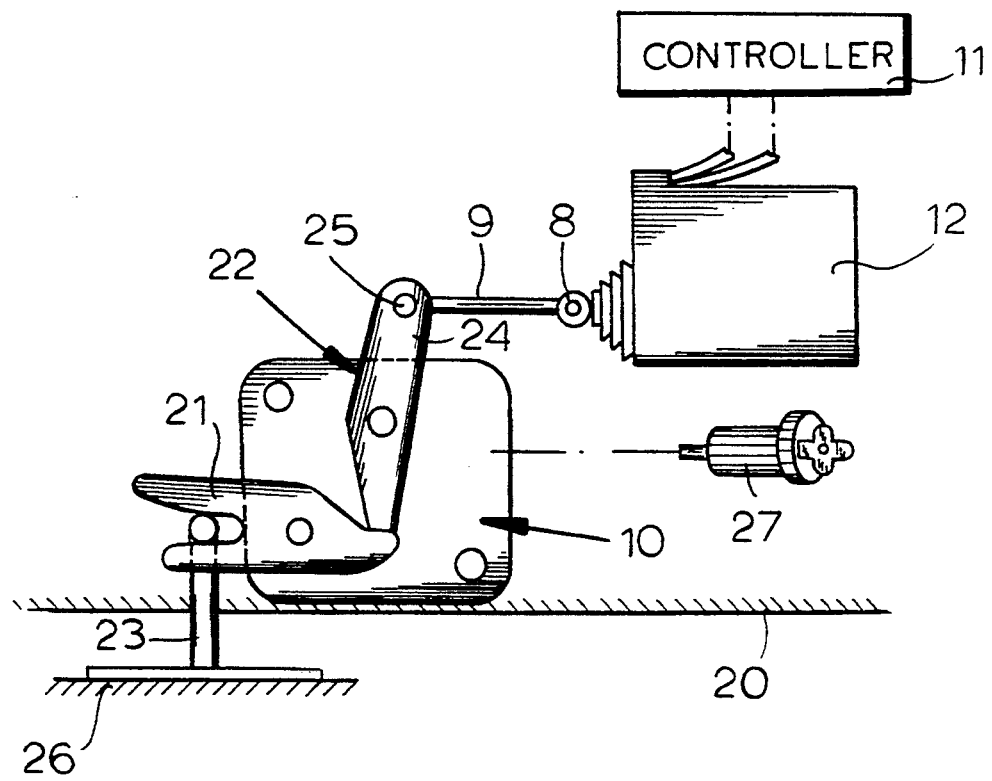
FIG. 3 is a small-scale and partly diagrammatic view of the system of this invention.

More specifically as seen in FIG. 3, this latch 10 is mounted in a trunk lid 20 and has a fork 21 that can engage through a U-bolt 23 fixed to the motor-vehicle frame 26. A pawl 22 can pivot to retain the fork 21 in the illustrated holding position and has an arm 24 connected at 25 to the rod 9 coupled at its opposite end to the operating member 8 of the nut 7. Thus if the nut 7 and member 8 are pushed out in an actuating direction (to the left in FIG. 1) the pawl 22 will release the fork 21 to allow the trunk 20 to be opened. A manual release shown as a key cylinder 27 can act on the pawl also to release the trunk lid 20.

According to the invention a return device 16 constituted as a bellows-type spring 17 is connected between the housing 12 and the operating member 8 to urge the member 8 and nut 7 inward into the housing 12, toward the right as seen in FIG. 1. This is in a direction tending to hold the latch 10 in the illustrated closed position.

The coupling 4 is constituted as a U-section or channel-shaped rocker housing or holder 13 pivoted on the shaft 2 for movement about the axis 2A and having two side walls 18 in which are journaled two intermediate gears 14 that are both identical to the gear 13 with which they both mesh on diametrically opposite sides. A biasing unit 15 constituted by a magnet 15a mounted centrally in the back of the rocker housing 13 and another magnet 15b mounted in the wall of the housing 12 and separated from the magnet 15a by a gap 19 normally urges the rocker 13 into the illustrated central position shown in solid lines. In this central position neither of the gears 14 meshes with the gear 5 so that the coupling 4 does not connect the gear 3 to the gear 5. When tipped in either direction as illustrated in dot-dash lines in FIG. 2, one of the gears 14 meshes with the gear 5 to couple the gear 3 with the gear 5. The force exerted by the centering unit 15 is such, compared to the torque exerted on the rocker housing 13 when the motor 1 is rotating its shaft 2, that the rocker 13 is in fact tipped about its axis 2A in the direction the shaft 2 is rotating in whenever this shaft 2 is rotated.

Figure 4:
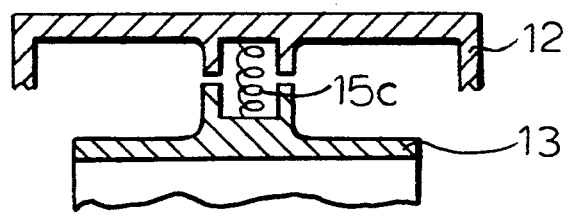
FIG. 4 is a detail view of a variation on the system of FIGS. 1-3.

FIG. 4 shows how the magnets 15a and 15b can be replaced by a spring 15c.

Thus with this system when the motor 1 is energized, for instance from a controller shown schematically at 11 in FIG. 3, it will exert torque in one or the other direction on the shaft 2 and gear 3 and therethrough on the gears 14. This torque will be sufficient to rock the housing 13 and bring one or the other of the gears 14 into mesh with the gear 5 so that the gear 3 will drive the gear 5, for instance screwing out the nut 7 and opening the latch 10.

Once this action is completed, the motor 1 can be de-energized. As soon as the shaft 2 stops rotating, the biasing unit 15 will return the rocker 13 to the intermediate position with both gears 14 out of mesh with the gear 15. The spring 17 will then push the member 8 back in, reverse rotating the spindle 6 by pushing the nut 7 back in. The actuator will therefore automatically return to its starting position.

I claim:

1. A motor-vehicle power actuator comprising:
   a housing;
   an electric motor in the housing having an output shaft defining a shaft axis and rotatable thereabout;
   an input gear fixed on the shaft axis and rotatable thereabout by the motor;
   a threaded spindle extending along and rotatable about a spindle axis in the housing;
   an output gear fixed on the spindle adjacent and out of contact with the input gear;
   a nut threaded on the spindle and nonrotatable relative thereto, whereby rotation of the spindle in one rotational sense displaces the nut axially relative to the spindle axis in an actuation direction and rotation of the spindle in an opposite rotational sense displaces the nut axially relative to the spindle in an opposite release direction;
   a rocker pivotal in the housing on the shaft axis;
   an intermediate gear journaled in the rocker, meshing with the input gear, and also meshable with the output gear, the rocker being pivotal between an end position in which the intermediate gear meshes with the output gear and through an intermediate position in which the intermediate gear does not mesh with the output gear, the rocker and intermediate gear being so positioned that, on normal forward rotation of the motor shaft, the rocker moves into its end position;
   biasing means including a magnet seated in the housing and another magnet in the rocker adjacent the housing magnet for urging the rocker into the intermediate position except when the motor is energized and is rotatably driving its shaft; and
   spring means engaged between the housing and the nut for axially biasing the nut in one of the directions, whereby when the motor is not actuated the biasing means disconnects the input and intermediate gears from the output gear and the spring means urges the nut in the one direction.

2. The motor-vehicle power actuator defined in claim 1 wherein the motor is reversible and the rocker is provided with two such intermediate gears and is movable through two such respective end positions in each of which a respective one of the intermediate gears is meshing with the output gear and the other intermediate gear is out of mesh with the output gear, both intermediate gears being out of mesh with the output gear in the intermediate position.

3. The motor-vehicle power actuator defined in claim 1 wherein the rocker is of U-section and has a pair of side walls extending diametrally of the shaft and traversed thereby, the intermediate gears being journaled in the side walls and diametrically flanking the input gear.

4. The motor-vehicle power actuator defined in claim 1 wherein the biasing means is a mechanical spring braced between the housing and the rocker.

5. The motor-vehicle power actuator defined in claim 1 wherein the spring means includes a bellows spring connected between the housing and the nut.

6. A motor-vehicle power actuator comprising:
 a housing;
 an electric motor in the housing having an output shaft defining a shaft axis and rotatable thereabout;
 an input gear fixed on the shaft axis and rotatable thereabout by the motor;
 a threaded spindle extending along and rotatable about a spindle axis in the housing;
 an output gear fixed on the spindle adjacent and out of contact with the input gear;
 a nut threaded on the spindle and nonrotatable relative thereto, whereby rotation of the spindle in one rotational sense displaces the nut axially relative to the spindle axis in an actuation direction and rotation of the spindle in an opposite rotational sense displaces the nut axially relative to the spindle in an opposite release direction;
 a rocker pivotal in the housing on the shaft axis;
 an intermediate gear journaled in the rocker, meshing with the input gear, and also meshable with the output gear, the rocker being pivotal between an end position in which the intermediate gear meshes with the output gear and through an intermediate position in which the intermediate gear does not mesh with the output gear, the rocker and intermediate gear being so positioned that, on normal forward rotation of the motor shaft, the rocker moves into its end position;
 biasing means for urging the rocker into the intermediate position except when the motor is energized and is rotatably driving its shaft; and
 spring means including a bellows spring connected between the housing and the nut for axially biasing the nut in one of the directions, whereby when the motor is not actuated the biasing means disconnects the input and intermediate gears from the output gear and the spring means urges the nut in the one direction.

7. The motor-vehicle power actuator defined in claim 6 wherein the biasing means is a magnet seated in the housing and another magnet in the rocker adjacent the housing magnet.

* * * * *